July 7, 1931.  I. H. JUDD  1,812,959
APPARATUS FOR MAKING WHEEL SPIDERS
Filed July 23, 1928   6 Sheets-Sheet 4

Inventor
Irving H. Judd

By Whittemore, Hulbert, Whittemore & Belknap
Attorneys

July 7, 1931.   I. H. JUDD   1,812,959
APPARATUS FOR MAKING WHEEL SPIDERS
Filed July 23, 1928   6 Sheets-Sheet 5

Inventor
Irving H. Judd

July 7, 1931.  I. H. JUDD  1,812,959
APPARATUS FOR MAKING WHEEL SPIDERS
Filed July 23, 1928  6 Sheets-Sheet 6
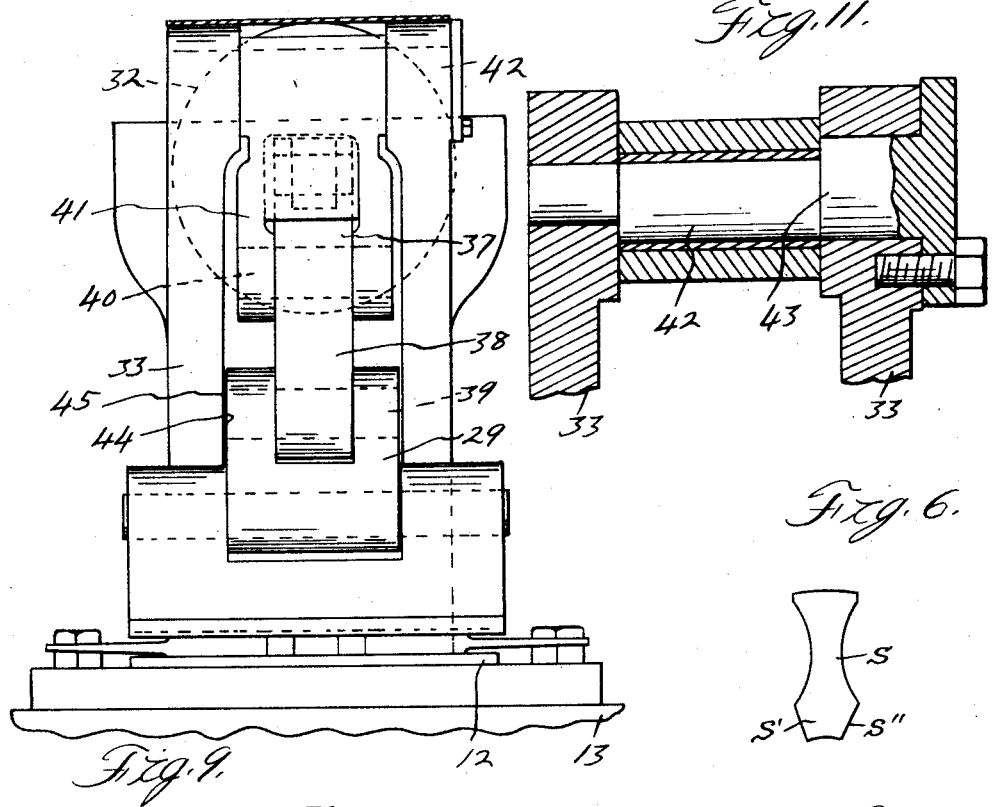
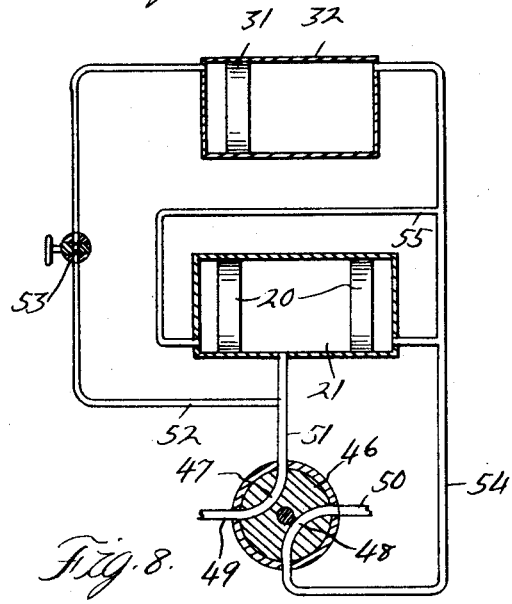
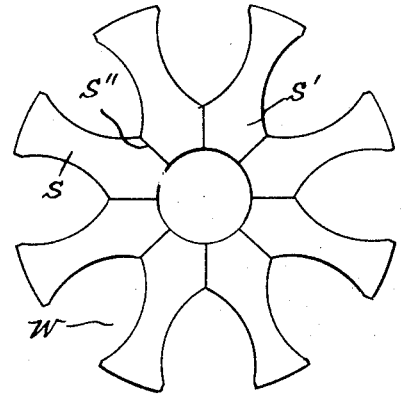
Inventor
Irving H. Judd Patented July 7, 1931

1,812,959

UNITED STATES PATENT OFFICE

IRVING H. JUDD, OF DETROIT, MICHIGAN, ASSIGNOR TO WHITEHEAD AND KALES COMPANY, OF RIVER ROUGE, MICHIGAN, A CORPORATION OF MICHIGAN

APPARATUS FOR MAKING WHEEL SPIDERS

Application filed July 23, 1928. Serial No. 294,714.

This invention relates to wheel spiders and to the apparatus for making the same and more particularly to an apparatus for making wheel spiders which comprise a plurality of separate spoke members united at the hub by welding.

The present invention has as one of its objects to provide an apparatus wherein the uniting of separate spoke members into a complete wheel spider is facilitated and wherein further the steps of the aforementioned method may be performed with expediency and dispatch.

A further object of the present invention resides in the provision of automatically operable means for holding and subsequently clamping the spokes or spider sections in position to permit the ready accomplishment of the welding operation.

The several objects and advantages of this invention will be made more apparent in the accompanying specification, especially when considered in connection with the accompanying drawings, wherein:

Figure 6 is an elevational view of one of the spokes;

Figure 7 is an elevational view of the completed spider;

Figure 8 is a diagrammatic view showing the means for actuating the clamping and work holding means;

Figure 9 is an end elevation of one of the fixtures showing the toggle actuating clamping means;

Figure 10 is a sectional view taken on the plane indicated by the line 10—10 of Figure 2.

Figure 1:
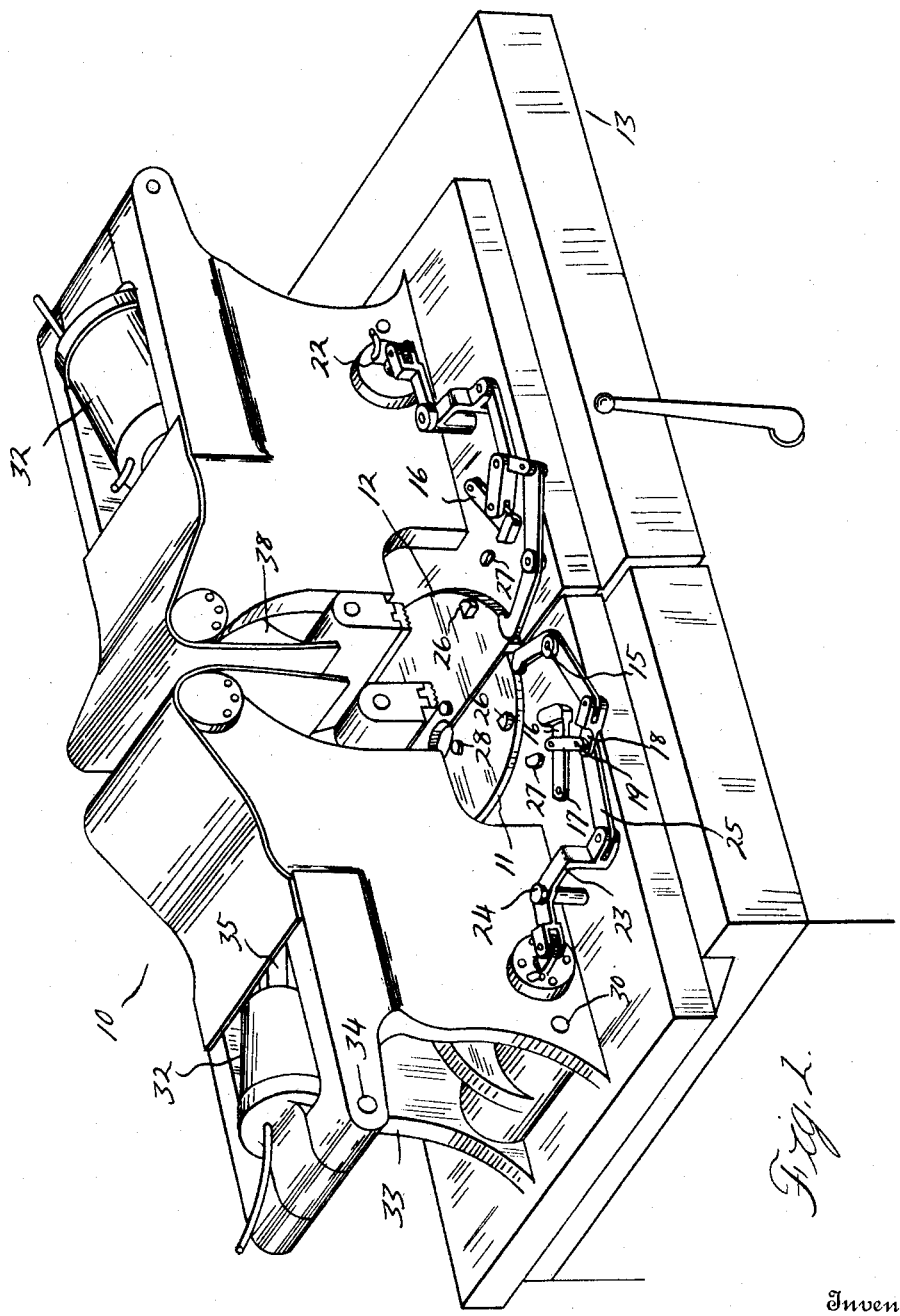
Figure 1 is a fragmentary perspective view of a welding machine having my invention applied thereto.

Referring now particularly to the drawings wherein like reference characters indicate like parts, it will be noted that there is illustrated, particularly in Figure 1, a conventional form of welding machine 10 upon which stationary and movable work holding fixture plates 11 and 12 respectively, are mounted. The movable fixture plate 12 is slidable toward and from the stationary plate 11 along guides 13 provided on the welding machine base.

Referring more particularly to Figures 6 and 7, it will be understood that the problem involved is that of constructing a wheel spider from a plurality of spoke members S each of which is provided with a hub portion S' of segmental shape in plan view, the end faces S'' of which are adapted to be butt or flash welded to the necessary adjacent spoke members to form the complete wheel spider W.

Figure 4:
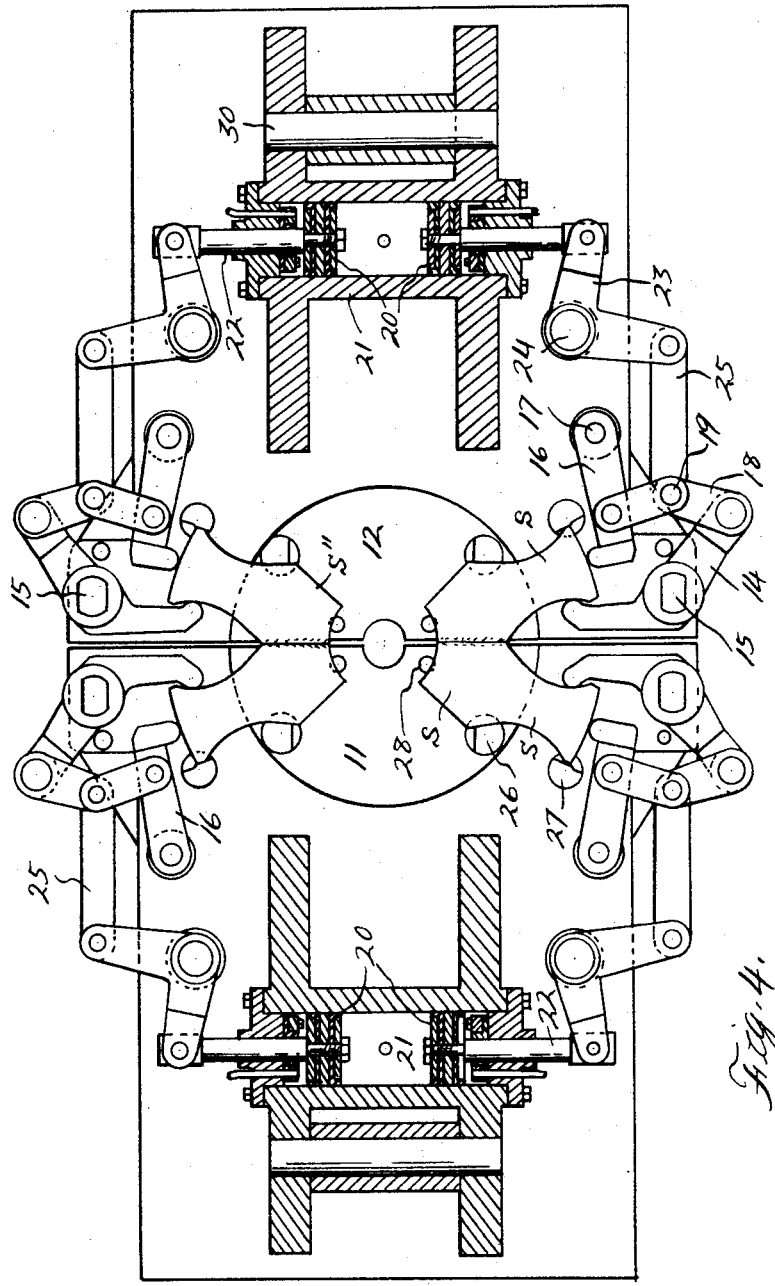
Figure 4 is a plan view partly in section of the construction illustrated in Figure 1 showing the work holding means in engagement with the spokes or spider sections.
Figure 5:
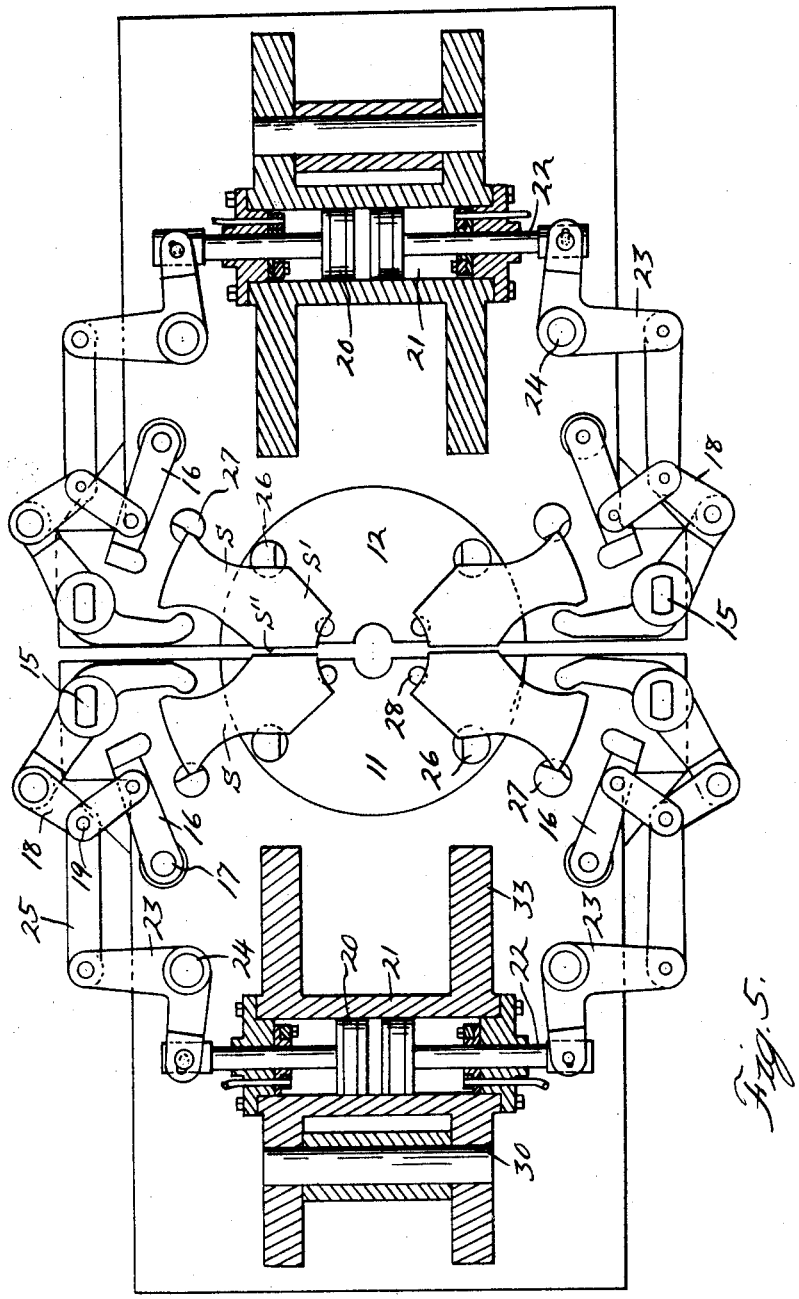
Figure 5 is a view similar to Figure 4 showing the holding means in inoperative position.

By referring particularly to Figures 1 and 4, it will be noted that the work holding fixtures each comprises a plurality of articulated levers arranged in cooperative relation, one to another, and also cooperating with a plurality of fixed stops. More specifically, each fixture includes a pair of main bell crank levers pivotally mounted as at 15 to their respective plates 11 and 12 and a pair of arms 16 mounted as at 17 on the plates 11 and 12. The bell cranks 14 and arms 16 are arranged in pairs and connected together by means of links 18, having their inner ends pivotally connected as at 19 and their outer ends pivotally connected to the bell cranks 14 and arms 16. These links provide means for simultaneously rocking the bell cranks 14 and arms 16 and are operable by means of fluid actuated pistons 20 reciprocable in opposite directions within the cylinders 21 formed upon the respective plates 11 and 12. The pistons 20 carry shafts 22 connected at their outer ends to one of the arms of the bell crank levers 23, which in turn are pivotally connected upon the plates 11 and 12 as at 24, and have their other ends connected to the pivots 19 for the arms 16 by means of links 25. Thus upon movement of the pistons outwardly, the shafts 22 will be displaced longitudinally and through the bell crank levers 23, links 25 and links 18 will rock the bell crank levers 14 and arms 16 so as to cause the free ends thereof to engage respectively against the outer and side edges of the adjacently positioned spokes. This holds the spokes in engagement with the pair of adjacent fixed stops 26 and 27 and also against fixed stop pins 28 so that they are rigidly held in the position illustrated in the drawings. The system of levers and cranks just described is duplicated upon the fixed and movable fixtures 11 and 12 as will be apparent.

Associated with each fixture plate is a swinging top clamping member 29 pivotally connected as at 30 and adapted to be swung downwardly into clamping engagement with the top surface of the spokes or spider sections. In order to automatically operate the clamping member 29 and hold the same in firm engagement with the spokes or spider sections, the pistons 31 are provided. These pistons reciprocate in the cylinders 32 mounted upon upright members 33 by means of pins 34. Pivotally mounted as at 36, upon the free ends of the rods 35 carried by the pistons 31, are the toggle levers 37 having depending offset portions 38 pivotally connected as at 39 to the free ends of the clamping members 29. Extending upwardly from the toggle member 37 and pivotally connected thereto intermediate the ends thereof as at 40, is a second pair of toggle members 41. The lower portions of the levers 41 are bifurcated, as shown, for receiving the levers 37, while the upper portions thereof are pivotally connected to the upright members 33 by means of the pins 42, the latter having eccentric portions 43 rendering possible adjusting within limits the amount of clamping force exerted upon the work by the toggle connection and also compensating for any wear in the parts thereof. Assuming that the mechanism is in the position illustrated in Figure 3 and it is desired to clamp the work, the pistons 31 together with the rods 35 are moved toward each other, thereby rocking the levers 37 about the pivots 40 tending to straighten the toggle links to the position illusrated in Figure 2 and consequenly swinging the members 29 into clamping engagement with the work.

Figure 2:
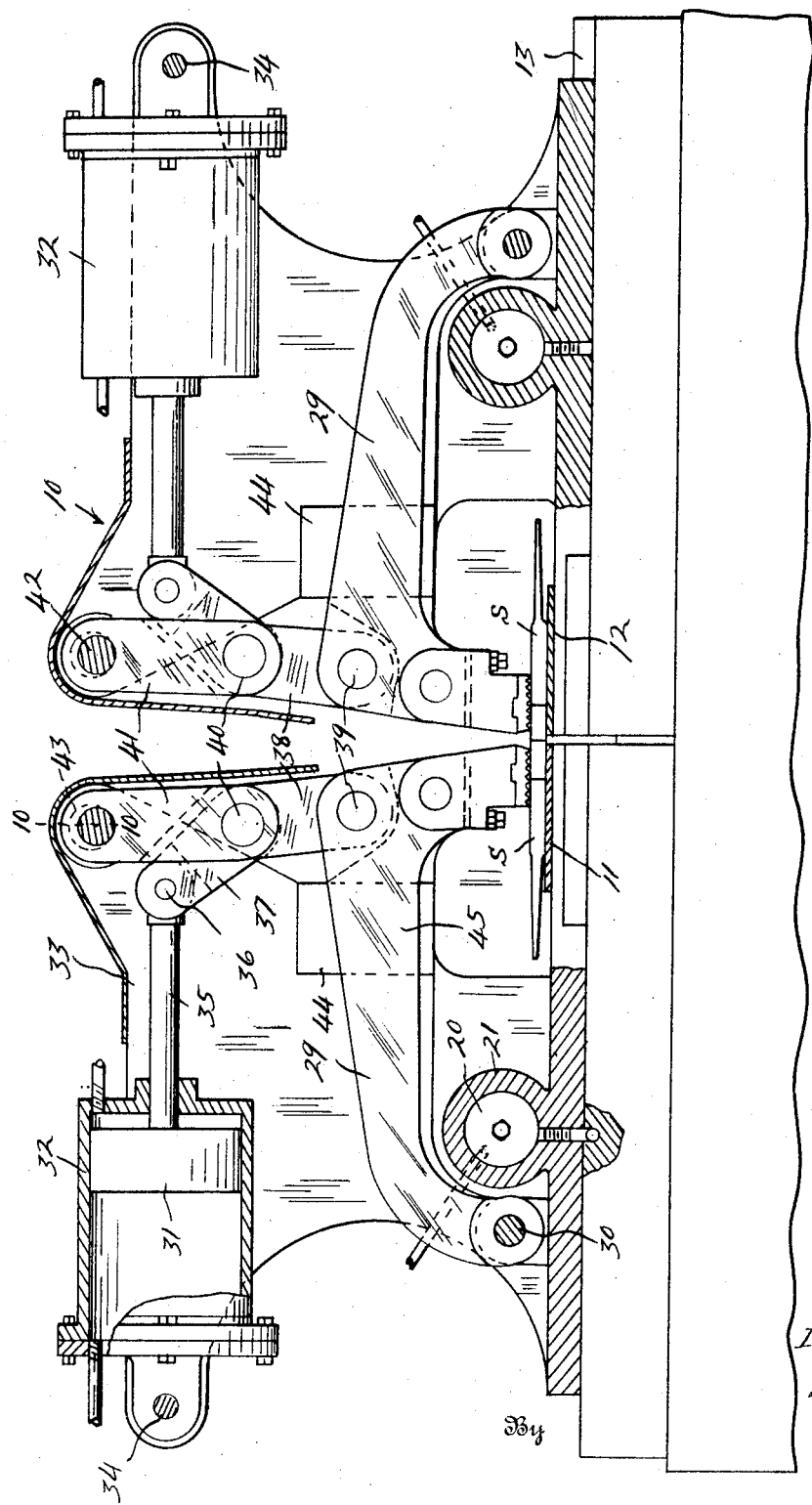
Figure 2 is a side elevational view partly in section of the construction illustrated in Figure 1 showing the work in clamped position.
Figure 3:
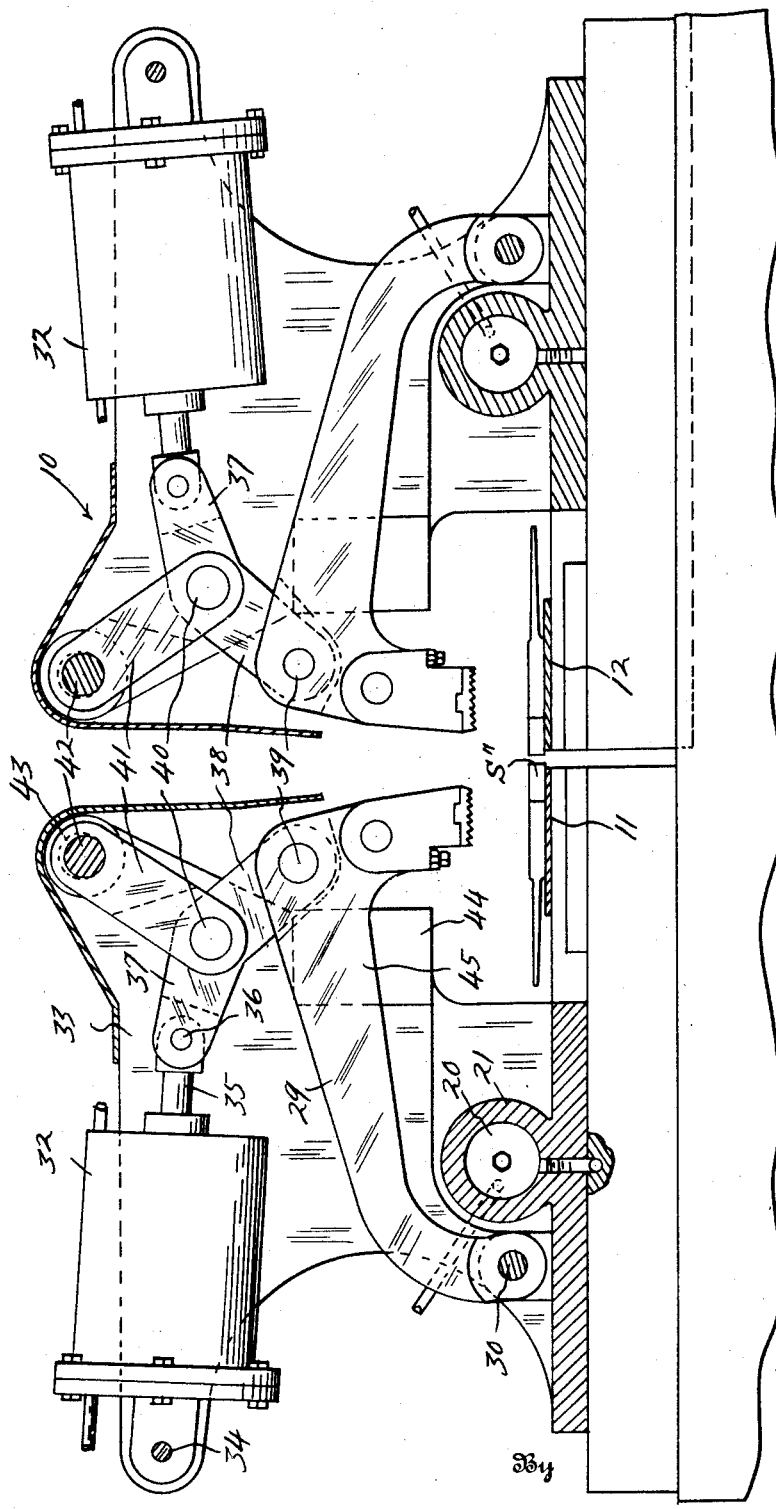
Figure 3 is a view similar to Figure 2 showing the clamps in released position.

By reference to Figures 2 and 3, it will be noted that the cylinders 32 and rods 35 move from a position inclined to the horizontal in the unclamped position of the members 29 to a position substantially parallel to the horizontal in a clamped position of the members 29. This function is permitted by reason of the pivotal connections 34 heretofore pointed out between the cylinders 32 and uprights 33. As shown, in Figures 2 and 9, the clamping members 29 are accurately guided during the swinging movement thereof by means of the inwardly extending projections 44 formed on the uprights 33 and having substantially flat inner surfaces 45 engageable with the opposite sides of the clamping members 29.

In order to actuate the pistons 20 and 31 to automatically effect the operating of the work holding and clamping means, I provide the following arrangement which incidentally is capable of actuating the holding means prior to the clamping means. In considering the following description, it will be apparent that reference is made to the means for actuating the clamping and holding means upon only one of the fixtures 11 and 12, the means employed for actuating the clamping and holding means upon the opposite fixture being substantially a duplicate of the following means and accordingly it is not determined necessary to describe the same. The means employed in the present instance is a pair of three-way valves, one of which is illustrated at 46, having the usual passages 47 and 48 both of which are adapted to communicate with a supply conduit 49 and an exhaust conduit 50. The passage 47, as shown in Figure 8, is also adapted to establish communication between the source of supply and the cylinders 21 intermediate the ends of the latter and between the pistons 20 by means of the conduit 51, and to further establish communication with one end of the cylinder 32 by means of the conduit 52, the latter having a suitable check valve 53 rendering possible restricting the flow of fluid through the cylinder 32. The passage 48, on the other hand, is adapted to establish commmunication with the ends of the cylinder 21 in rear of the pistons 20 by means of the conduits 54 and 55. The conduit 54 also communicates with the opposite end of the cylinder 32. The arrangement is such that when the valve is in the position illustrated in Figure 8, the fluid will flow from the supply conduit 49 through the passage 47 in the valve to the cylinder 21 intermediate the pistons 20 and consequently force the latter away from each other to move the holding means into operative engagement with the work in the manner heretofore pointed out. At the same time, however, fluid is forced through the conduit 52 into the cylinder 32 in front of the piston 21 to force the same inwardly and thereby effect a clamping of the work clamping means as heretofore set forth. The velocity of the fluid flowing through the conduit 52 being accurately determined by means of the valve 53 so that the piston will be detained in its operation until the pistons 20 have operated to move the holding means into engagement with the work. Thus the work will be accurately positioned before the members 29 are permitted to clamp the same upon the plates 11 and 12. It will be further noted from Figure 8 that the passage 48 of the valve is in registration with the exhaust conduit 50 and the distributing conduit 54 so that the fluid in the cylinders 21 and 32 may exhaust through the conduits 55 and 54 into the atmosphere. When, however, it is desired to disengage the work from the holding and clamping means, the valve 46 is merely rotated 90° thereby moving the passage 48 out of registration with the exhaust conduit 50 and into registration with the supply conduit 49 and distributing conduit 51. In this latter position of the valve, the passage 47 assumes a position wherein it is in registration with the distributing conduit 51 and exhaust conduit 50. The arrangement is such that fluid will be conveyed through the passages 54 and 55 and into the cylinders 21 and 32 to return the pistons to their inoperative positions and thereby disengage the holding and clamping means from the work. During this operation, the fluid in the cylinders is exhausted through the conduits 52 and 51. As heretofore pointed out, there are preferably two valves 46, one for each of the fixtures 11 and 12, and these valves are preferably suitably connected together so as to be capable of simultaneous operation and thereby permit the two fixtures to operate as a unit.

Thus from the foregoing, it will be apparent that I have provided relatively simple automatically operable means for holding and subsequently clamping the spokes or spider sections in position upon the fixtures prior to welding the same together.

While in describing and particularizing upon the advantages and features of the present invention, particular stress has been placed upon the fact that the holding and clamping means are operated by fluid pressure and by means of the foregoing valve arrangement, it will be apparent that various other operating means may be utilized for actuating the holding and clamping means. To this end reservation is made to make such changes in the method and the details of construction of the article and the apparatus as may come within the purview of the accompanying claims.

What I claim as my invention is:

1. In a welding machine for wheel spiders, a work holding fixture having means for positioning the spider units to be united, holding levers adapted to engage said unit at points substantially opposed to said positioning means, clamping means for clamping the unit in position, and means for simultaneously operating said levers and for subsequently operating said clamping means.

2. In a welding machine for wheel spiders, a work holding fixture having means for positioning the spider units to be united, swingingly mounted levers adapted to engage said unit for holding the same, clamping means movable in a plane transverse to the plane of movement of said levers and adapted to engage the unit to clamp the same in place, and automatically operable means for actuating said levers and clamping means in synchronism.

3. In a welding machine for wheel spiders, a work holding fixture having members for positioning the spider units to be united, means cooperating with said members to hold the unit in position, means for clamping said unit in place, and means for synchronously operating said clamping and holding means whereby the latter operates to hold the work prior to the operation of said clamping means.

4. In a welding machine for wheel spiders, a holding fixture having means for positioning the spider units to be united, articulated levers positioned upon opposite sides of said fixture and adapted to engage the units to accurately hold the same in place, a clamping member adapted to engage the units to rigidly clamp the same in position, and means for automatically and simultaneously operating said levers and for subsequently operating said clamping member.

5. In a welding apparatus, a work support, work positioning means including fixed elements upon said support and pivotally mounted means movable over said support in a plane substantially parallel thereto relative to said elements, means movable in a plane at substantially right angles to the support for clamping the work upon said support after being positioned thereon, and a common actuating means for said clamping means and movable positioning means aforesaid.

In testimony whereof I affix my signature.

IRVING H. JUDD.